United States Patent [19]
Nakamura et al.

[11] Patent Number: 4,878,394

[45] Date of Patent: Nov. 7, 1989

[54] DRIVE MECHANISM FOR TILTABLE STEERING COLUMN

[75] Inventors: Yoshiyuki Nakamura, Nara; Teruo Koyama, Okazaki, both of Japan

[73] Assignee: Koyo Seiko Kabushiki Kaisha, Japan

[21] Appl. No.: 212,341

[22] Filed: Jun. 27, 1988

[30] Foreign Application Priority Data

Jun. 25, 1987 [JP] Japan .................. 62-156632

[51] Int. Cl.[4] .................. B62D 1/18; F16H 29/20
[52] U.S. Cl. .................. 74/493; 74/89.15; 74/570; 280/775
[58] Field of Search .................. 74/493, 570, 89.15; 280/775

[56] References Cited

U.S. PATENT DOCUMENTS

| | | | |
|---|---|---|---|
| 4,050,318 | 9/1977 | Wolf | 74/89.15 |
| 4,335,625 | 6/1982 | Nishikawa | 74/493 |
| 4,642,839 | 2/1987 | Urban | 74/570 X |

FOREIGN PATENT DOCUMENTS 1000330 3/1983 U.S.S.R. .................. 74/493

Primary Examiner—Leslie A. Braun
Assistant Examiner—Janice E. Chartoff
Attorney, Agent, or Firm—Bruce L. Adams; Van C. Wilks

[57] ABSTRACT

Disclosed is a drive mechanism in which a movable bracket is operatively connected to a drive source so that the movable bracket is moved to a desired angular position, the movable bracket including an upper jacket supporting an upper shaft provided with a steering wheel attached thereto. One end of the movable bracket is pivotally supported by a fixed bracket attached to a vehicle, and the other free end of the movable bracket is pivoted on a nut member which engages a lead screw through an eccentric bearing assembly. The eccentric bearing assembly causes angular movement in the bracket as the nut member is linearly moved by rotation of the lead screw.

1 Claim, 3 Drawing Sheets

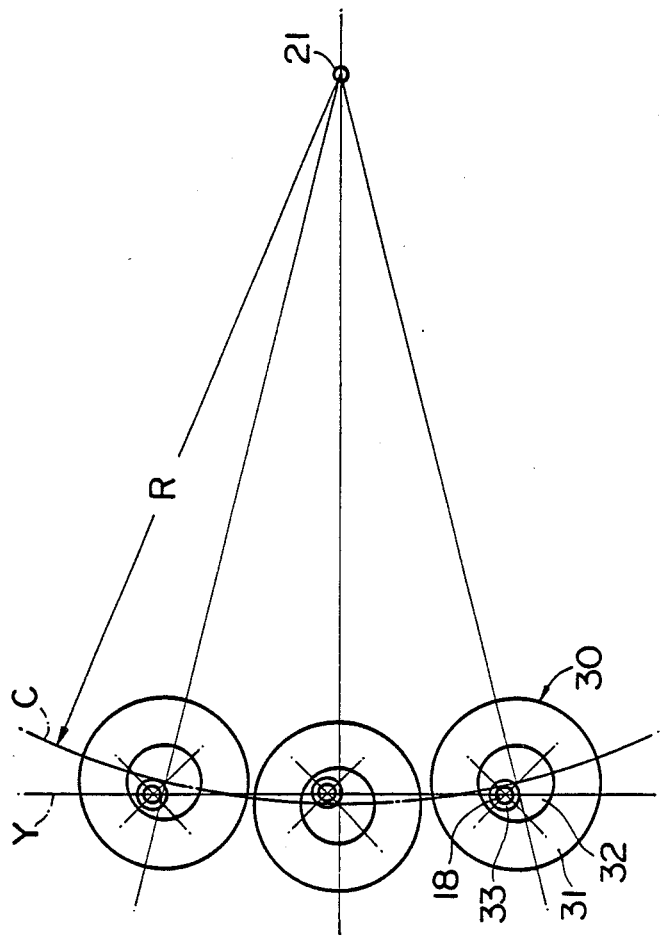

DRIVE MECHANISM FOR TILTABLE STEERING COLUMN

BACKGROUND OF THE INVENTION

1. Field of the Invention

The present invention relates to a vehicle steering apparatus, and particularly relates to a power drive mechanism for making a pivoted steering column tilt to a desired angular position.

2. Description of the Prior Art

In a vehicle steering apparatus having a tiltable column, a steering wheel is attached to an upper shaft which is in turn operatively connected to a lower shaft through a universal joint. The lower shaft is pivoted on a fixed bracket attached to a vehicle, and the upper shaft is pivoted on an upper jacket through a movable bracket supported by the fixed bracket. If the movable bracket is moved, the upper shaft tilts together with the upper jacket so that the steering wheel attached to the upper shaft is held at a desired angular position.

There are some ways to move such a movable bracket. In U.S. Pat. No. 4,633,732 issued Jan. 6, 1987, one end of a link bar is connected to a movable bracket at an end thereof separated farther from a fulcrum, and the other end of the link bar is connected to a nut member engaging a lead screw. The lead screw is driven by an electric motor through a reduction gear so as to move the nut member in the axial direction of the lead screw as the lead screw rotates so that the nut member causes the movable bracket to perform angular movement through the link bar. The opposite ends of the link bar act as joints so as to convert the linear movement of the nut member into rotational movement of the movable bracket. Accordingly, there has been a disadvantage that the link bar is complicated in mechanism and mechanical errors are apt to be caused.

SUMMARY OF THE INVENTION

It is an object of the present invention to provide a drive mechanism which is simple in structure and in which a movable bracket is operatively connected to a drive source so that the movable bracket is moved to a desired angular position, the movable bracket including an upper jacket supporting an upper shaft provided with a steering wheel attached thereto.

It is another object of the present invention, particularly, to provide a drive mechanism for a tiltable steering column in which a movable bracket is pivoted at its end portion on a nut member engaging a lead screw so that angular movement is caused in the movable bracket through no link bar unlike the conventional case, as the nut member is moved linearly by rotation of the lead screw.

BRIEF DESCRIPTION OF THE DRAWINGS

FIG. 3 is a view for explaining the operation of the drive mechanism according to the present invention.

DESCRIPTION OF THE PREFERRED EMBODIMENT

Figure 1:
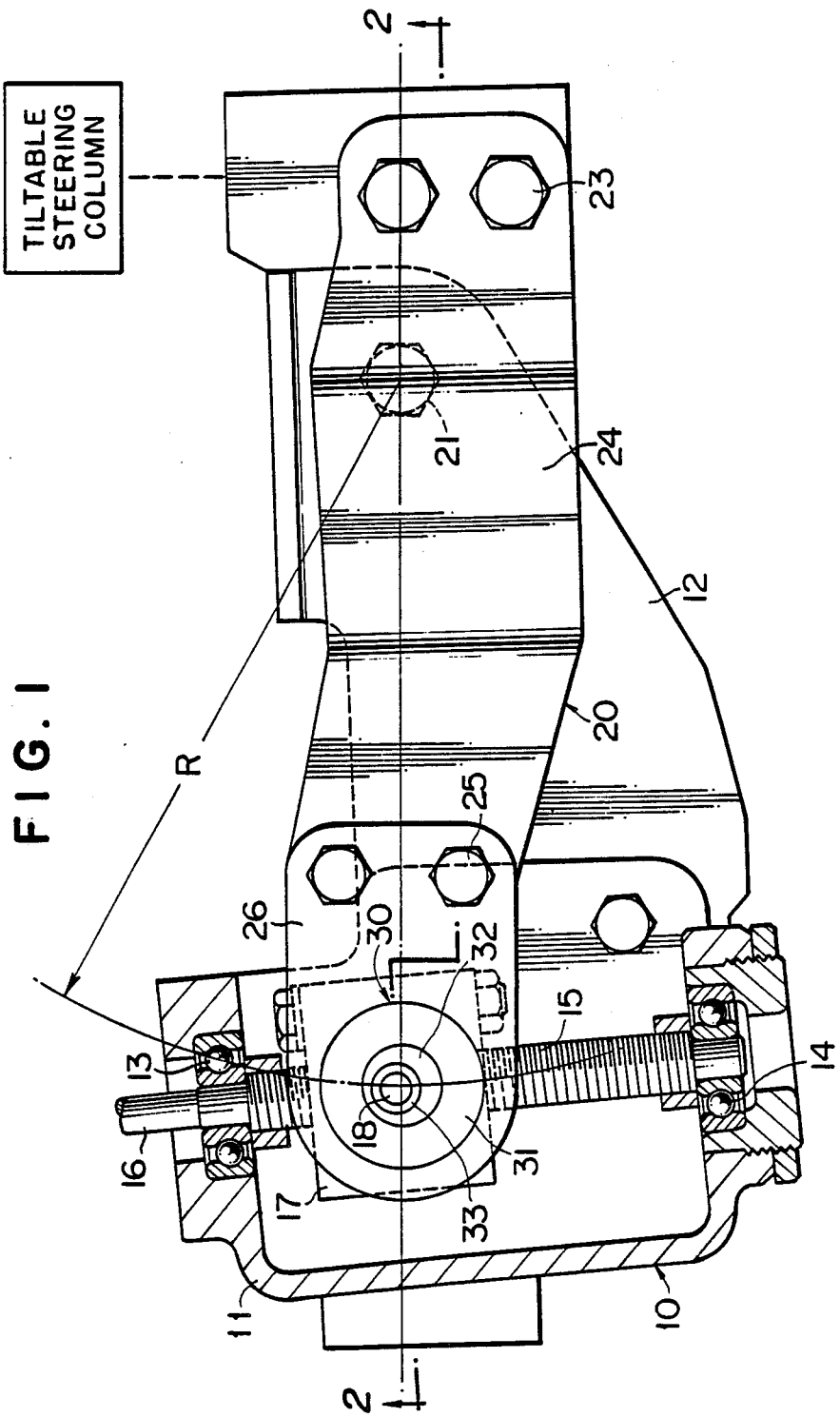
FIG. 1 is a partially cutaway side view showing the drive mechanism according to the present invention.
Figure 2:
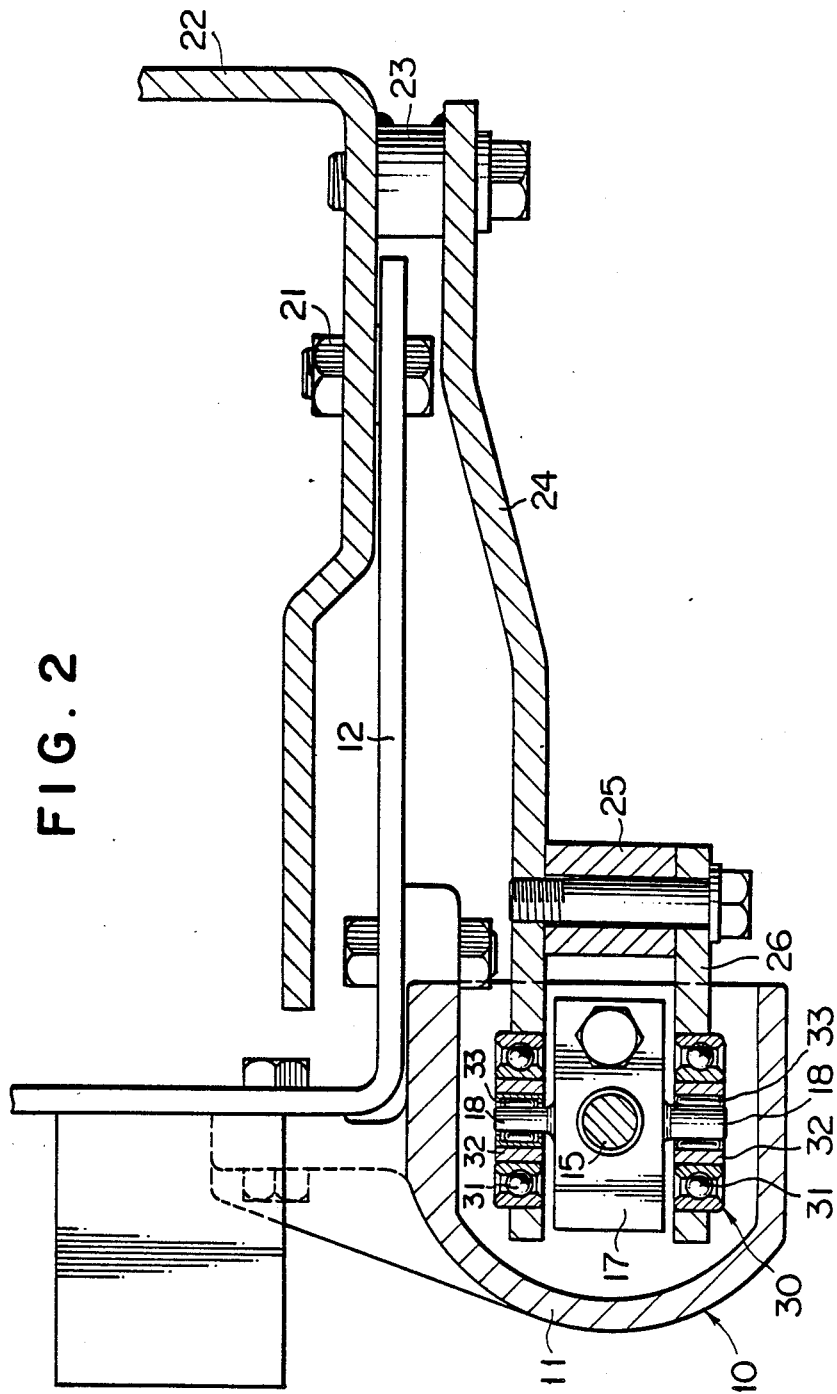
FIG. 2 is a sectional view taken on line 2—2 of FIG. 1.

Referring to FIG. 1, a housing 11 for a drive unit generally designated by the reference numeral 10 is provided on a fixed bracket 12. A pair of bearings 13 and 14 are mounted to the housing 11 so as to support a drive shaft 16 having a lead screw 15. The lead screw 15 engages a nut member 17 as clearly shown in FIG. 2, so that when the shaft 16 having the lead screw 15 is driven by an electric motor (not shown), the nut member 17 is moved in the axial direction of the lead screw 15 as the lead screw 15 rotates. A pair of fixed shafts 18 each having an axial line perpendicular to that of the lead screw 15 are provided on opposite side surfaces of the nut member 17.

The fixed bracket 12 is firmly attached to a part of a vehicle, and a movable bracket assembly 20 is pivotally supported by the fixed bracket 12 by means of a pivot 21. The movable bracket assembly 20 is constituted by a first member 22 on which an upper jacket (not shown) is attached, a second member 24 fixed to the first member 22 through connection rods 23, and a third member 26 fixed to the second member 24 through other connection rods 25. As well known in this field, the upper jacket (not shown) attached to the first member 22 pivotally supports an upper shaft provided with a steering wheel. The second and third members 24 and 26 extend in parallel with each other, and support eccentric bearing assemblies 30 at their free ends. Each of the bearing assemblies 30 includes a large bearing 31 supported by the free end of the movable bracket assembly 20, an eccentric collar 32 fixed inside the large bearing 31, and a small bearing 33 fixed on the eccentric collar 32 at its eccentric position, the small bearing 33 engaging the corresponding fixed shaft 18 provided on the nut member 17. Since the eccentric collar 32 is fixed to an inner race of the large bearing 31 and to an outer race of the small bearing 33, a turning pair is generated with respect to the movable bracket assembly 20 and the nut member 17.

If the nut member 17 is moved in the axial direction of the lead screw 15 as the lead screw 15 rotates, the movable bracket assembly 20 operatively connected to the fixed shafts 18 provided on the nut member 17 makes angular movement about the pivot 21. This is because, as seen from FIG. 3, if the nut member 17 is moved along the axial line Y of the lead screw 15, the eccentric collar 32 generates a turning pair with respect to the nut member 17 and the movable bracket assembly 20 since the eccentric collar 32 is provided between the small bearing 33 provided around the fixed shaft 18 and the large bearing 31 supported by the free end of the movable bracket assembly 20. As a result, the movable bracket assembly 20 makes angular movement so that the center of the bearing assembly 30 supported on the free end of the movable bracket assembly 20 passes an arc of a radius R about the pivot 21. Although the angular movement of the movable bracket assembly 20 is illustrated so as to be able over a range of about 28 degrees in the example of FIG. 3, it is sufficient if the movable bracket assembly 20 can be moved over a range of 15-20 degrees in a practical mechanism.

What is claimed is:

1. A drive mechanism for a tiltable steering column of a vehicle comprising:

a fixed bracket fixedly supportable on a vehicle during use of the drive mechanism;

a movable bracket pivoted on said fixed bracket for supporting a tiltable steering column at its one end during use of the drive mechanism;

a drive shaft having a lead screw supported by said fixed bracket;

a nut member engaging with said lead screw so that said nut member is movable along an axial line of said lead screw as said lead screw rotates, said nut member including a fixed shaft having an axial line perpendicular to said axial line of said lead screw; and a bearing assembly secured to the other end of said movable bracket, said bearing assembly including a large bearing supported by said movable bracket, an eccentric collar fixed inside said large bearing, and a small bearing fixed on said eccentric collar at its eccentric position, said small bearing engaging said fixed shaft provided on said nut member;

whereby said eccentric collar generates a turning pair on said nut member and said movable bracket when said nut member is moved as said lead screw rotates to thereby convert linear movement of said nut member into angular movement of said movable bracket so that the tiltable steering column supported by said movable bracket is held in a desired angular position.

* * * * *